March 7, 1933.  J. ELLBERG ET AL  1,900,414
FLUID PRESSURE GAUGE
Filed March 21, 1929
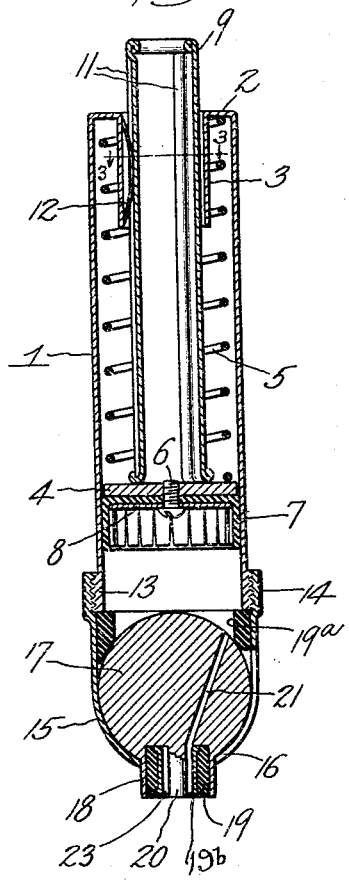
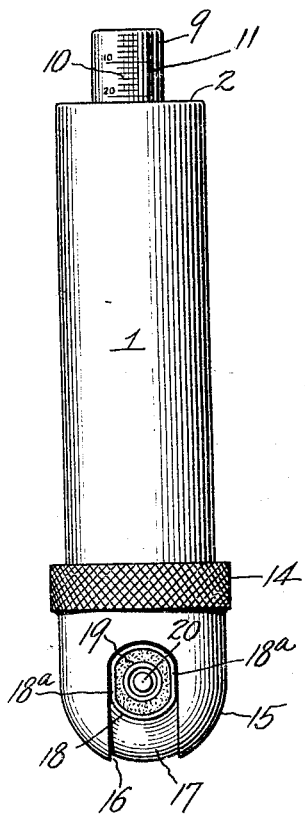
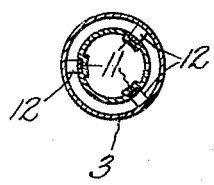
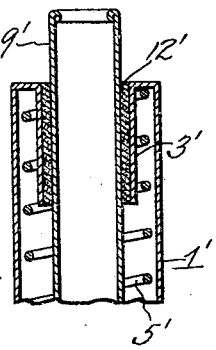
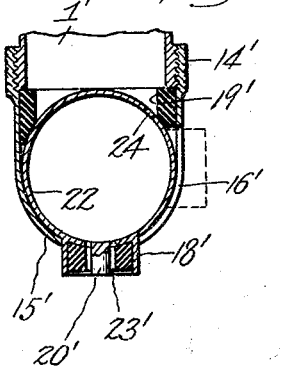
WITNESS
Oliver N. Holmes
Inventors
John Ellberg,
Magnus Cromwell
By their Attorneys Patented Mar. 7, 1933

1,900,414

UNITED STATES PATENT OFFICE

JOHN ELLBERG, OF NEW YORK, AND MAGNUS CRONWALL, OF BROOKLYN, NEW YORK, ASSIGNORS TO A. SCHRADER'S SON, INC., OF BROOKLYN, NEW YORK, A CORPORATION OF NEW YORK

FLUID PRESSURE GAUGE

Application filed March 21, 1929. Serial No. 348,736.

This invention relates to fluid pressure gauges such as those employed for determining the pressure of air in pneumatic tires and has for its object to provide an improved construction, combination, and arrangement of parts in a device of this character for the purpose of facilitating its attachment to a fluid pressure container such as a pneumatic tire. More specifically stated, our invention contemplates an improved tire gauge provided with a connection which may be adjusted angularly with respect to the axis of the cylinder within which a piston operates against a resistance proportional to its displacement such, for example, as that due to a compression spring interposed between the piston and one end of the cylinder.

Other and further objects of the invention appear in the specification, the particular features relating thereto being incorporated in the appended claims and referred to in the specification in connection with the attached drawing which shows a preferred embodiment of our invention.

In the drawing

Figure 1 is a section through the axis of a tire gauge constructed in accordance with principles of the present invention.

Figure 2 is a side elevation of the same taken from the left of Figure 1 and with the adjustable connections shown in a different position.

Figure 3 is a section on the line 3—3 of Figure 1.

Figure 4 is a fragmentary axial section showing a modification at one end of the fluid pressure cylinder.

Figure 5 is a fragmentary section of the connection end of the tire gauge according to a modified form.

Referring more particularly to the drawing, in the preferred embodiment of our invention shown therein, a cylinder or housing 1 which is open at one end and provided with a closed annular wall 2 at its other end, has a cylindrical wall or guide 3 presented inwardly from the inner edge of annular wall 2. Interposed between the annular wall 2 and a piston 4 which reciprocates within the cylinder 1, is a compression spring 5 which serves to impart a pressure proportional to the displacement of the piston 4 during its movement toward the annular wall 2. Secured to the piston 4, by means of a screw 6 is a leather cup 7 which is reenforced by a metal disc 8 interposed between the head of screw 6 and the leather cup 7. This metal disc is provided with a plurality of radial slits, the metal fingers between said slits being pressed inwardly and confined within the cylindrical flange of the cup leather 7, a yieldable pressure being thereby applied to said cylindrical flange in directions to press it against the inner wall of the cylinder. Normally resting against the piston 4 is a tubular gauge or stem 9 provided with a scale 10 for which the closed end of the housing may serve as an indicator for measuring the extent of the axial displacement of piston 4. Tubular gauge or stem 9 is movable together with or independently of the movement of piston 4. In order to provide a freer movement of the stem 9 as well as a smoother one while at the same time adapting said stem to maintain its position to which it has been displaced by fluid pressure acting on the piston 4, the outer wall of stem 9 is provided with a plurality of longitudinal grooves 11 which are angularly spaced from each other around its axis. Slidable lengthwise within these grooves and having their ends secured to the inner walls of the cylindrical guide 3 are a plurality of leaf springs 12.

As shown in Figure 1, the lower end of cylinder 1 is provided with an exteriorly-threaded boss 13 to which is screwed an interiorly threaded flange 14 of a rounded housing 15. The rounded housing 15 is provided with an arcuate slot 16 having the center of one semi-circular end thereof coaxial with the axis of cylinder 1 and extending for more than 90 degrees about an axis transverse to the cylinder axis (see Figure 2). Movable within the housing 15 and slidably contacting with the inner wall thereof is a ball 17 which is provided with a cylindrical flange 18 movable within the slot 16 after the threaded connection 13, 14, has been eased off. Interposed between the threaded boss 13 on the open end of the cylinder 1 and the spherical surface of ball 17 is an annular packing 19a constructed of any suitable material for making an air-tight joint when the threaded connection has been tightened up. If desired, the cylindrical flange 18 may be flattened on opposite sides as shown at 18a, said flattened sides being adapted to engage the edges of arcuate slot 16. Mounted within the flange 18 is an annular packing 19 which is supported around its inner wall by a tubular support or thimble 19b between which and a valve-key or pin 20 is formed an annular space 23. The parts 18 to 20 constitute what is commonly termed a press-on foot, which, when pressed against the end of a tire valve stem, unseats the valve therein and provides a leak-tight seal with the end of said valve stem. The opposite ends of thimble 19b are beaded over slightly onto the packing. Leading from the annular space 23 through the ball 17 is a port-opening 21 which opens into the lower end of the cylinder 1. An angular adjustment of the connection along the slot 16 is limited by the opposite ends of the arcuate slot 16, the inner end of port-opening 21 being arranged to pass well within the inner wall of annular packing 19a in all positions of the connection.

According to Figure 5 of the drawing, a hollow ball 22 is arranged within a rounded housing 15′, the interior of said hollow ball opening into an annular space 23′ extending around a valve-key or pin 20′. The hollow shell 22 is also provided with an inner port-opening 24 which opens into the lower end of cylinder 1′. The housing 15′ is provided with a flange 14′ which is threaded to the lower end of cylinder 1′ and thus adapted to draw the hollow ball 22 into close bearing contact with an annular packing 19′ which abuts against the lower end of said cylinder. Whenever the flange 14′ is eased off, the cylindrical flange 18′ which is presented outwardly from the hollow shell 22, may be adjusted along an arcuate slot 16′ for varying the angular arrangement of the cylinder 1′ with respect to the valve to which it may be attached.

While we have shown in Figures 1 and 3, a preferred yieldable connection between the measuring stem 9 and the cylindrical guide 3, we may employ a measuring stem 9′ as shown in Figure 4, said measuring stem being provided with a smooth outer wall and slidably supported within a cylindrical guide 3′ by means of an interposed packing 12′.

We claim:—

1. In a fluid pressure gauge, the combination of a cylinder provided with an articulated connection at one end and a guide at the other, of a piston movable in said cylinder, a stem reciprocable by said piston in said guide, and means interposed between said piston and the other end of said housing for imparting a resistance proportional to the displacement of said piston, said articulated connection being movable between positions in which it is respectively disposed coaxially with and normal to the axis of said cylinder.

2. In a fluid pressure gauge, the combination of a cylinder, a piston reciprocable in said cylinder, means for imparting a resistance to the movement of said piston, which is proportional to said movement, means for measuring the displacement of said piston, a rounded housing connected to one end of said cylinder, and a ball movably mounted in said rounded housing, said ball being provided with a port-opening communicating with the interior of the cylinder in different positions of the ball, said ball being provided with an annular packing between it and said cylinder, and means for limiting its movement to an extreme position in which the inner end of said port-opening is within said annular packing.

3. In a fluid pressure gauge, the combination with a cylinder provided at one end with a rounded housing having an elongated slot therein, of a piston movable in said cylinder, a stem reciprocable by said piston, a pressure resistance interposed between said piston and the other end of said housing, said pressure resistance being adapted to react with a pressure proportional to the displacement of said piston, and a member slidably contacting with the inner wall of said rounded housing and provided with a port-opening connection presented through and adjustable along said elongated slot.

4. In a fluid pressure gauge, the combination of a cylinder, said cylinder being provided with a threaded boss at one end, a piston reciprocable in said cylinder, means for imparting a resistance to and proportional to the movement of said piston, means for measuring the displacement of said piston, a rounded housing having threaded connections with said threaded boss on the cylinder, said rounded housing being provided with an arcuate slot in its rounded wall, a ball oscillatably mounted in said rounded housing, said ball being provided with a connection presented through and adjustable along said arcuate slot and with a port-opening communicating with the interior of the cylinder in all positions of said connection.

5. A fluid pressure gauge comprising a receptacle provided with fluid pressure measuring means and having a cylindrical portion and a press-on foot providing an articulated connection with one end of the cylindrical portion and angularly adjustable in relation to the axis of the cylindrical portion to positions in which said press-on foot is respectively disposed coaxially with and normal to the cylindrical axis, said press-on foot in all adjustable positions being in open communication with said measuring means, and packing means at said articulated connection between said press-on foot and said cylindrical portion for insuring a leak-tight connection therebetween.

6. A fluid pressure gauge comprising a receptacle provided with fluid pressure measuring means and having a cylindrical portion, a rounded housing connected to the open end of said cylindrical portion, a ball articulated in said rounded housing, a press-on foot connected to said ball said ball being provided with a port-opening communicating with the interior of the cylindrical portion and with the press-on foot in all articulated positions of the ball and means for limiting the articulation of the ball so that the press-on foot may be disposed in any position between coaxial alinement with, and normal to the cylindrical axis.

JOHN ELLBERG.
MAGNUS CRONWALL.